United States Patent [19]

Perazzoni et al.

[11] 4,292,194

[45] Sep. 29, 1981

[54] LIQUID COMPOSITION FOR LIGHT AND HEAT STABILIZATION OF POLYAMIDES

[75] Inventors: Pierluigi Perazzoni, Palazzolo; Luigi Bilancini, Cesano Maderno, both of Italy

[73] Assignee: Snia Viscosa Societa' Nazionale Industria Applicazioni Viscosa S.p.A., Milan, Italy

[21] Appl. No.: 48,985

[22] Filed: Jun. 15, 1979

[30] Foreign Application Priority Data

Jun. 15, 1978 [IT] Italy ................ 24585 A/78

[51] Int. Cl.$^3$ .................. C09K 15/02; C09K 15/06
[52] U.S. Cl. .................. 252/400 R; 260/29.2 N; 260/45.75 C
[58] Field of Search ............ 260/29.2 N, 45.75 C, 260/820, 45.9 C; 252/400 R

[56] References Cited

U.S. PATENT DOCUMENTS

| | | | |
|---|---|---|---|
| 3,313,769 | 4/1967 | Maahs et al. | 260/45.75 C |
| 3,383,353 | 5/1968 | Goto | 260/45.75 C |

FOREIGN PATENT DOCUMENTS

| | | | |
|---|---|---|---|
| 1173247 | 7/1964 | Fed. Rep. of Germany | 252/400 |
| 1173249 | 7/1964 | Fed. Rep. of Germany | 252/400 |
| 2605794 | 8/1976 | Fed. Rep. of Germany | 260/45.75 C |
| 1147216 | 4/1969 | United Kingdom | 260/45.75 C |

*Primary Examiner*—Benjamin R. Padgett
*Assistant Examiner*—Irwin Gluck
*Attorney, Agent, or Firm*—Karl F. Ross

[57] ABSTRACT

A composition for increasing the light and heat stability of polyamides comprises a copper salt bound to a halogen atom and to a hydrosoluble organic compound. The organic compound is able to maintain the CuX compound or its complexes in solution in water up to about 60° C.

13 Claims, No Drawings

LIQUID COMPOSITION FOR LIGHT AND HEAT STABILIZATION OF POLYAMIDES

FIELD OF THE INVENTION

The present invention relates to a liquid composition for use as a light and heat stability promoter for polyamides, to a method of preparing said composition, to its use as an additive, to the polyamides containing said composition and to the products made therefrom.

BACKGROUND OF THE INVENTION

It is known that products made from polyamides are sometimes subject to marked degradation from exposure to light and heat, resulting in poorer mechanical properties, such as reduced hardness, tenacity and elasticity, and in rigidity and fragility. Degradation may cause yellowing of the product, if due to the light, or even produce a brown color, if due to heat. Such color changes too are undesirable and harmful.

The art believes said degradation to be largely due to oxidation caused by peroxide radicals, formed by the action of light or heat, which convey atmospheric oxygen to the polymer chain structure.

To prevent degradation, oxidation inhibitors having the property of capturing radicals are usually added to the polyamides. Generally said inhibitors were previously known as oxidation inhibitors for rubber, lubricating oils, etc.

Among them, the most commonly used are phenol or arylamine compounds and compounds containing halogens, heavy metals, or phosphorus.

The phenol oxidation inhibitors are alkylated phenols which confer a certain stability to light and often avoid undesirable discoloration, but are generally not effective against heat a temperatures above 165° C.

The arylamine oxidation inhibitors, used with success in the rubber and lubricating-oils industry, have the drawback that when used to stabilize polyamides, they produce colors from yellow to brown and are ineffective against light.

The phosphorus oxidation inhibitors, which may be alkali or alkali-earth salts or amino compounds of phosphorus containing acids, such as hypophosphites, phosphites and phosphates, or their organic derivatives such as arylphosphites and arylhypophosphites, do not cause discoloration but are less effective stabilizers than arylamines, and sometimes affect the rheologic properties of the polymers and therefore the drawability of fibers made therefrom.

The halogenated oxidation inhibitors, which are mostly halogenated organic compounds or preferably alkali or alkaline-earth metal or amino halides, have the same drawbacks as the phosphorus compounds.

It is also known to employ mixtures of this last type of inhibitors with phenol, arylamino or phosphorus inhibitors, to obtain a balanced oxidation inhibition while leaving the polymer's properties unaffected, insofar as possible. The results thus obtained are sometimes satisfactory for molded polymers, but not for the production of synthetic fibers.

Further complementary agents are used to boost the action of oxidation inhibitors, which contain heavy metals in the form of inorganic or organic salts. In the case of polyamides, zinc, chromium, manganese, copper, tin, and germanium salts are mostly used. When associated with the aforementioned oxidation inhibitors they may also facilitate the molecular dispersion of the polymer and promote synergistic actions due to the ability of the several inhibitors to act at different temperatures.

Zinc, chromium, tin and germanium salts, however, promote heat stability only to a limited extent. Manganese salts are light stabilizers as effective as copper salts, but are ineffective against heat, and sometimes confer undesirable coloration to the polymer.

Copper salts have undesirable pink, red, or violet colors in the polymers due to the precipitation of copper in colloidal form during the polymerization and especially during the re-melting of the polymer granules for spinning or molding. They have a certain usefulness when associated with phosphorus compounds, such as phosphoric or phenylphosphorous acids, but their drawbacks remain, and the polymer viscosity is adversely affected by the phosphorus compounds. Furthermore the bivalent copper salts oxidize the polymers and are reduced to univalent salts.

Univalent copper halides, while effective light and heat stabilizers for polyamides are only used to a very limited extent since they are insoluble in water and can be kept in solution only by using a great excess of halogenic acids.

The reaction

$$CuX + HX \rightleftharpoons [CuX_2]^- H^+ \qquad (1)$$

is an equilibrium reaction and at least 10 mols of halogen per mol of copper are required to shift it in the direction required for maintaining the CuX in solution. Since preferably between about 0.6–1.0 mols of copper per ton of polymer are used, 10 or more mols of halogenic acid per ton of polymer would be necessary, besides the water pertaining thereto, and such large amounts of halogen are very undesirable.

DESCRIPTION OF THE INVENTION

Applicants have now surprisingly found that the drawbacks of the art may be obviated by adding suitable organic compounds adapted to maintain the monovalent copper halides and/or their complexes in solution in a relatively small amount of water and in the presence of a minimal amount of hydrohalogenic acid.

An object of the present invention is therefore a composition (hereinafter called for brevity "composition A") useful as a polyamide light and heat stabilizer additive, free from the hereinbefore mentioned drawbacks of the known stabilizers.

Said composition (A) is characterized in that it is constituted by a clear aqueous solution which comprises, besides water, at least one univalent copper salt bound to one or more halogen (X) atoms, which constitutes the active part of the additive, and one or more organic compounds at least one of which (indicated hereinafter as compound (B)) is miscible with or soluble in water and is capable of decreasing the precipitating power of the water of the univalent copper salts, the molar ratio $\Sigma X/Cu^{\oplus}$ (wherein $\Sigma X$ represents the sum of the halogen mols) being less than 8 and the amount of compound (B) being sufficient to maintain the compound CuX and/or its complexes in solution at temperatures lower than 60° C. and preferably lower than 30° C.

Chlorine, bromine and/or iodine can be conveniently used as halogen X. Preferably the molar ratio $\Sigma X/Cu^{\oplus}$ is $\leq 5$ and more preferably it is comprised between 1.8 and 5. Among the compounds (B) miscible with water, caprolactam, acetone, the alcohols such as methyl and ethyl alcohol, ethylene glycol, dioxane, furane etc., employed individually or in mixtures are cited as non-limitative examples.

The amount of compound (B) should be high enough to maintain the additive clear at the temperatures lower than 60° C. so that if the additive becomes turbid when stored, it will be sufficient to heat it to about 60° C. Preferably this amount should be high enough to maintain the additives clear even in cold rooms.

Preferably in the composition (A) according to the present invention the weight ratio of compound (B) to the copper, reckoned as metal, is greater than 3.0 and more preferably greater than 4.5, while the weight ratio of compound (B) to the water is more than 0.44 and more preferably greater than 0.5.

A further object of the present invention is a process for the preparation of the aforesaid composition (A). According to this invention the method comprises the steps of:

(a) dissolving copper metal (powders, shavings or the like), optionally in the presence of copper halides, in one or more hydrohalogenic aqueous acids (having the formula HX wherein X is halogen) and heating the resulting mixture to a temperature preferably comprised between 80° and 160° C. while eliminating by distillation a part of the water which is present and/or has been formed, to maintain a high concentration of the acid while it reacts with the copper;

(b) adding to the complex $$[CuXX_1]^{\ominus}H^{\oplus} \qquad (2)$$

(wherein X and $X_1$, are the same or different and each represents a halogen atom) formed in step a), an amount of compound (B) sufficient to prevent precipitation at a temperature of about 60° C.

Preferably the weight ratio of compound (B) to the complex having the formula (2),

is greater than 0.6 and preferably greater than 1.

Preferably the molar ratio $\Sigma X/Cu$ in the reaction mixture in the step (a) is between 3 and 8 and more preferably it is about 4. This has the advantage that the copper metal can be dissolved with a smaller amount of hydrohalogenic acid than would be required if the distillation were not carried out and that the hydrogen developing on the copper metal reduces any amounts of molecular halogens $X_2$ (or their complexes), which may be present to hydrohalogenic acids HX.

This fact is important because it permits preparing the additive A with hydrohalogenic acids free from reducing phosphorus compounds (such as e.g. hypophosphorous acid which applicants have surprisingly found to decrease the drawability of the fibers).

The addition of the compound (B) is effected preferably at a temperature between 40° and 140° C.

A further object of the present invention is the use of the composition (A) to increase the light and heat stability of polyamides. According to this aspect of the invention the amount of composition (A) to be used may vary within wide limits, but is generally comprised between 0.01% and 10%, more preferably between 0.03% and 1%, by weight of the polymer.

The advantages of the additive composition according to the present invention, with respect to those known in the art, are many and include:

(1) It is very economical because it is constituted of low cost materials.

(2) It is very active because it has a high copper content and is easily dispersed in the polymers, can be employed at a very low concentration, and it confers high light and heat stability without producing discoloration or affecting the rheologic properties of the polymers.

(3) It is very versatile both as the destination and mode of use.

Thus, it may be employed directly in the polymers as well as in low or high viscosity spinning compositions. Further, since it is liquid and homogeneous, it may be used:

(a) by adding it directly to the monomer before polymerization, becoming immediately uniformly dispersed in liquid form in the polymerization mass;

(b) by making master batches containing more than 20 times the ordinary concentration, which may be employed for stabilizing polyamides without lowering their mechanical qualities and the physical characteristics;

(c) by adding it to the polymer granules before their use, either before drying them or thereafter, without need of any further drying before melting the granules in an extruder or the like.

(4) The copper is contained as a complexed cuprous salt which is stable in the molten polymer since it does not become decomposed or separated. This is a considerable advantage over the use of bivalent copper salts, since these latter become monovalent when the polymer is melted or already during the polymerization, freeing oxygen or halogens which oxidize the polymer.

(5) It is also advantageous with respect to the use of monovalent copper salts known in the art, since these must be added to the monomers, as they cannot become homogeneously distributed in the polymer, and even then, must be employed with very fine grain sizes, requiring mechanical expedients to avoid sedimentation and occasionally producing small clots or even black points because of imperfect solution.

(6) It permits the use of pneumatic transport which is by far the most economical and widespread means for polymer conveyance in industry.

(7) It is also adapted to dissolve further additives which may be desirable to add to the polymers and which, because they either are solids or pastes, are not easy to feed into the autoclaves or to disperse directly on the granules.

Said additives may be e.g. amines or monovalent and/or bivalent acids used as polymeric chain terminators, plastifiers, waxes for facilitating the discharge from molds, amine or phenol or like oxidation inhibitors, antistatics such as polyoxyalkylenes and/or amino or arylsulphonic derivatives for improving dyeability or color stability. Compounds of the above types are easily dissolved in the composition according to the present invention, increasing its volume without the addition of inert solvents and facilitating its distribution.

Because of the aforesaid advantages each of which may be more or less useful, in each particular case, all the heat and light stability requirements of the various polyamides produced in a plant may be satisfied with one suitably chosen composition according to the invention, so that a single additive and even a single method of addition may be used to process plastics for molding and polymers for making continuous yarns having highly different applications, (such as high count monofilament yarns for agriculture, or fine count yarns for fish nets, fabrics for pneumatics, field tent covers, covers for trucks and railroad cars, motorcar seat covers, and the like)

A further object of the present invention is the heat and light stable polyamides treated with the composition (A) as well as the products made therefrom.

The polyamides are preferably polyamide 6; 6, 6; 11; 6, 10; 12; as well as the polymer of meta-xylylenediamine adipate.

The following examples are illustrative bu. they are not limitative. Unless otherwise specified, all parts are by weight.

DESCRIPTION OF THE PREFERRED EMBODIMENTS

EXAMPLES 1 TO 14

The examples tabulated in Tables 1 and 2 show the action of compound (B) in maintaining the compound having the formula (2) in solution. It is seen that a cuprous halide, or its complex with hydroidic acid, is maintained in clear liquid solution, viz. its precipitation is prevented (although the free hydroidic acid is present in a very small amount) by the addition of a certain amount of at least a compound (B) such as acetone, methyl or ethyl alcohol, optionally associated with caprolactam.

Examples 1 and 8 are comparison examples. They are outside the scope of the invention as no compound (B) is added and therefore the hydrohalogenic acid must be employed in such amounts that the ratio X/Cu will be greater than 8 to maintain the copper halide in solution.

univalent copper—viz. the molar ratio X/Cu is about 9. The addition of compounds (B) reduces the ratio X/Cu from 9 to 2.1 to 2.4. If it is assumed that the copper is dissolved as ion $[CuX_2]^{\ominus}$, then the halogen excess is reduced from 7 mols/mol of the complex to 0.1 to 0.4 mols/mol of complex, viz. the excess is reduced 20 to 70 times.

Table no. 2 shows that similar results are obtained by employing univalent copper chloride and bromide instead of iodide. The amount of total halogens ($\Sigma X$) chlorine, bromine, iodine is such that the $\Sigma X/Cu$ in the absence of compounds (B) is about 10, while in the presence of compounds (B) it reaches 2.2, passing from 8 excess halogen mols per mol of complex $[CuX_2]^{\ominus}$ to only 0.2 excess mols. The halogen excess is reduced 40 times. Concentrated hydrochloric acid and concentrated hydrobromic acid too behave analogously to HI.

Example 13 shows that the solution A containing the water soluble (B) compounds acetone and caprolactam may remain clear even after the addition of water insoluble compounds, in this case toluene and the oxidation inhibitor known under the trade name Naugard 431 (produced by Naugatuck Corp.).

These last two products have been added in an amount as high as 25 Kg per 19 Kg of composition A. This illustrates the already stated fact that the solutions which constitute composition (A) may also be used as vehicles for other additives, and then the compounds (B) not only maintain the copper salts in solution but render water insoluble compounds compatible with water.

In the absence of compound (B) much higher amounts of hydrohalogenic acid are required and sometimes it is not even possible to render the monovalent copper halide soluble.

TABLE NO. 1

Solubility of Cu I as a function of the amounts of HI and organic solvents.

| Example NO. | Cu I Parts by weight | HI 58% Parts by weight | Compounds having the formula (B) Parts by weight | X/Cu molar ratio | H₂O % | Cu % |
|---|---|---|---|---|---|---|
| 1 | 1 | 9.2 | 0 | 9 | 38.0 | 3.3 |
| 2 | 1 | 1.3 | Acetone 5 | 2.1 | 7.5 | 4.6 |
| 3 | 1 | 6.6 | CH₃OH 2.5 + Caprolactam 2 | 6.7 | 23.0 | 2.8 |
| 4 | 1 | 4.4 | CH₃OH 1.7 + Caprolactam 2.2 | 4.8 | 20.0 | 3.6 |
| 5 | 1 | 2.64 | CH₃OH 1 + Caprolactam 1.7 | 3.3 | 17.5 | 5.3 |
| 6 | 1 | 2.2 | CH₃OH 0.83 + Caprolactam 1.75 | 2.9 | 16.0 | 5.8 |
| 7 | 1 | 1.65 | CH₃OH 0.63 + Caprolactam 1.32 | 2.4 | 15.0 | 7.2 |

TABLE NO. 2

Solubility of CuCl as a function of the amount of HI and organic solvents.

| Example NO. | CuCl Parts by weight | HI 58% Parts by weight | Compounds having the formula (B) Parts by weight | X/Cu molar ratio | H₂O % | Cu % |
|---|---|---|---|---|---|---|
| 8 | 1 | 20 | | 10 | 40 | 3.1 |
| 9 | 1 | 6 | Acetone 12 | 3.7 | 13.2 | 3.4 |
| 10 | 1 | 6 | Caprolactam 5 | 3.7 | 21 | 5.4 |
| 11 | 1 | 3 | Caprolactam 4 + Acetone 9.5 | 2.3 | 7.2 | 3.7 |
| 12 | 1 | 2.7 | Caprolactam 3.7 + Acetone 6 | 2.2 | 8.5 | 4.8 |
| 13 | 1 | 3.5 | Caprolactam 6.5 + Acetone 8 + toluene 5 + Antiox Naugard 431 Kg 20 | 2.6 | 3.3 | 1.5 |
| 14 | 1 (in the form of CuBr) | 2.7 | Caprolactam 6 + C₂H₅OH 1 | 2.5 | 10.6 | 4.2 |

The Examples tabulated in Table no. 1 show that when the compound (B) is absent, about 9 mols of halogen are required to maintain in solution one mol of

EXAMPLE 15

1.373 kg of an additive prepared according to Example 7 of Table 1, which contains 7.2% of copper and 15% of water, is added to a ton of polyamide 6 polymer (polycaprolactam) having relative viscosity in $H_2SO_4$ 3.22 and relative humidity 0.03%. After said addition, the polymer contains 100 p.p.m. (parts per million) of copper, 484 p.p.m. of iodine and 0.051% residual humidity.

Since high viscosity polyamides may easily be extruded or anyway re-melted as long as their humidity does not exceed 0.08%, the humidity increase caused by the additive, equal to 0.021%, has no negative effects and does not require a further drying of the polymer. The polymer was extruded into filaments having a diameter of 4 mm which were drawn to draw ratio 1:4.5 to obtain a high tenacity yarn for agricultural uses, which yarn will be designated by the abbreviation "15A". The viscosity of the polymer after extrusion, measured on the yarn, was 3.27. Obviously no viscosity decrease was due to the additive.

If, on the other hand, the additive of comparison Example 1 of Table 1 is used, to obtain a copper content of 100 p.p.m., 3.05 kg of additive are required which imply 115.5 g of water per ton of polymer; therefore said polymer has to be dried before extrusion, since it contains 0.145% of water, well above the 0.080% limit aforesaid.

EXAMPLE 16

(a) Comparison yarn is prepared which is identical to yarn 15A but made from a polymer not containing an additive, and will be designated by the abbreviation "15C". The two yarns are wound up on two identical bobbins so as to form one layer and are then exposed together at 60°±2° C. for 200 hours in a "Color Fadeometer mod. FDA-R (of the Firm Atlas Electric Devices Co., Chicago)" apparatus.

The treatment serves to determine the light stability of the two samples.

The following results are obtained:

TABLE NO. 3

| Sample | Specific tenacity before exposure g/mm² | Specific tenacity after 200 h exposure in the Fade-ometer g/mm² | Residual tenacity % |
| --- | --- | --- | --- |
| 15A (with additive) | 38.5 | 37.58 | 97.6 |
| 15C (without additive) | 38.9 | 16.07 | 41.3 |

The tenacity has been measured by means of an Instrom model 1114 dynamometer after 24 hours at room temperature in a calcium chloride dryer.

(b) The two yarns 15A and 15C aforesaid are made into 50 g skeins and exposed for 4 hours to a temperature of 177° C. in a circulating air oven. The samples are withdrawn from the oven and are allowed to cool for 20 min in a calcium chloride dryer and are then subjected to tenacity measurements by means of the dynamometer described under (a) according to the F.D. Nr. 9-4 Heat resistance Nylon method of Goodyear Tire and Rubber Company. The following results are obtained:

TABLE NO. 4

| Sample | Specific tenacity before exposure g/mm² | Specific tenacity after 4 h at 177° C. g/mm² | Residual tenacity % |
| --- | --- | --- | --- |
| 15A (with additive) | 38.5 | 36.7 | 95.3 |
| 15C (without additive) | 38.9 | 17.0 | 43.7 |

From the light and heat stability tests hereinbefore tabulated it is seen that sample 15A maintains its tenacity practically without variations after the exposures while the samples which do not contain additive are strongly degraded resulting in lowered characteristics.

EXAMPLE 17

In a 15 liter pyrex glass flask provided with a rectification column, thermometer and bottom discharge, electrically heated, are charged: 0.720 Kg of electrolytic copper shavings. 9.94 Kg of hydroiodic acid (concentration 58%) 1.45 Kg of aqueous ammonia (concentration 13.2%)

The flask is heated to progressively higher temperatures so as always to maintain the liquid at boiling, 2.2 liters of water with 0.4% of hydroiodic acid being distilled. The distillation proceeds to temperatures of about 120° C. and ends with the complete dissolution of the copper. The liquid which was initially red because the HI contained free iodine, becomes colorless a few minutes after the beginning of the boiling since the free iodine is removed by the reaction:

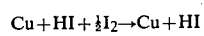

$$Cu + HI + \tfrac{1}{2}I_2 \rightarrow Cu + HI$$

(actually the iodine is reduced by the hydrogen which develops on the copper).

In another flask, which will be called "R", the 2.2 liters of distilled water containing 0.4% HI are collected on 6 kg of caprolactam.

At the end of the copper dissolution, all the content of the 15 liter flask is discharged, still warm, into vessel R where it is cooled to about 40° C. by the melting heat of caprolactam. In vessel R, therefore, a homogeneous clear solution is obtained having a temperature of about 40° C.

The solution A is bottled in packages of about 3 Kg, each sufficient for about 3 tons of polymer.

This preparation has been made with copper metal which is more economical than pure cuprous iodide and does not contain free iodine which confers to the polymer an undesired yellow color. In said preparation $\Sigma X/Cu$ is about 4, and the additive (B) is constituted by the mixture of 2.2 liters of water plus the 6 Kg of caprolactam which were in the collecting vessel R.

In spite of the low hydroiodic acid content there is no precipitation at the room temperature of 25° C.

EXAMPLE 18

3000 Kg of caprolactam and 60 Kg of water are charged into a 5000 liter autoclave. The content of a 3 Kg bottle prepared according to Example 17 is added. There is no precipitation because the additive A becomes homogeneously distributed in the monomer. The polymerization is carried out in a known manner at 262° C. and after 8 hours the polymer is extruded into cables having a diameter of 3 mm which are cut into chips having the shape of an equilateral cylinder. The chips, washed 4 times with distilled water, practically contain the same percentage of copper and iodine which they contained before washing. After drying at 115° C. in a rotating drum under vacuum, the viscosity of the polymer in sulphuric acid, measured at 20° C., is 3.35 and its relative humidity is 0.04%.

The polymer is spun according to the known art through spinnerets having 204 orifices. The yarn is drawn on plates heated to 160° C. to a draw ratio 1:5.05 to obtain a yarn having the high count 1600 denier/204, which will be designated by the abbreviation "18A". A polymer having viscosity 3.35 and not containing an additive is spun and drawn in identical equipment to obtain a yarn having the same count, which will be designated by the abbreviation "18C". The two yarns are subjected to light and heat degradation fadeometer and air oven under the conditions described in Example 16.

TABLE NO. 5

| Yarn | The following results are obtained: | | | | | | | | |
|---|---|---|---|---|---|---|---|---|---|
| | Characteristics of the yarn before treatment | | | Characteristics after treatment for 4h at 177° C. in air oven | | Characteristics after treatment for 200h in the fadeometer | | | |
| | tenacity g/den | elongation at break % | initial modulus g/den | tenacity g/den | residual tenacity % | tenacity g/den | residual tenacity % | elongation at break % | modulus g/den |
| 18A (with additive) | 8.7 | 18.32 | 42.36 | 8.48 | 97.47 | 8.24 | 94.71 | 18.6 | 37.4 |
| 18C (without additive) | 8.55 | 18.5 | 41.88 | 3.34 | 39.1 | 2.31 | 27.02 | 7.58 | 38.66 |

The mechanical characteristics of yarns 18A and 18C have been determined by means of a dynamometer model 1112 of the Firm Instrom Limited. The tests are carried out under the conditions of Example 16.

They show that 0.1% of the additive of Example 17 confers excellent heat and light atability, so that larger amounts are not needed. Further, the yarns containing the additive remain white and no separation of copper in the polymer occurs during re-melting or spinning.

EXAMPLE 19

(a) In a 1000 liter autoclave are charged:
100 kg of distilled water
2 kg of a 75% hexamethylenediamine aqueous solution (as polymeric chain terminator)
580 Kg of hexamethylene adipate
15 Kg of compound (A) prepared according to Example 17.

The autoclave is washed with vacuum and nitrogen 5 times to remove the air and the polyamide 6—6 is polymerized according to the known art by heating to 265° C. and reaching a maximum autoclave pressure of 15 atm. Subsequently, as the polycondensation proceeds, the water vapor is vented until room pressure is reached and then a vacuum is applied to reach a residual pressure of 125 mm Hg in 4 hours. The polymer is extruded into chips as described in Example 18. The relative viscosity of the polymer obtained, measured in sulphuric acid at 20° C., is 2.5.

Said polymer contains 30 times the ordinary amount of additive A and is therefore a master batch to be added to polymers not containing additive to confer thereto the desired heat and light stability. The polymer will be indicated by the abbreviation "MB 19A".

(b) 3000 Kg of a polyamide 6—6 (polyhexamethylenediamine) (designated by the abbreviation "19C") having relative viscosity 2.65 are mixed with 100 Kg of MB 19A polymer and the mixture is dried and homogenized in a rotating drum dryer. After heating for 12 hours at 115° C. under a residual pressure of 0.5 mm Hg, a residual humidity of 0.05% has been found. The polymer thus obtained, designated by the abbreviation "19A", is spun on a conventional spinning machine.

The spinning conditions are the following:

Extruder temperature: 195° C.
Spinning head temperature: 280° C.
Number of orifices per spinneret: 10
Wind-up speed: 1000 m/min
Oil finish on the yarn: 0.4%

The yarn has been drawn at 110° C. to ratio 1:3.8 to obtain a 60 denier/10 19A yarn having tenacity 5.2 g/denier.

A comparison 19C yarn has been prepared from additive-free polymer under the same conditions and in identical equipment.

The two yarns have been subjected to light and heat stability tests, applying a 200 hours treatment in fadeometer and a 4 hours treatment at 177° C. in air oven as described in detail in Example 18. Subsequently the characteristics have been determined by means of an Instrom model 112 dynamometer, obtaining the following results:

TABLE NO. 6

| Yarn | Yarn tenacity before treatment g/den | Characteristics after 200 h in the fadeometer | | Characteristics after 4 hours at 177° C. in air oven | |
|---|---|---|---|---|---|
| | | tenacity g/den | residual tenacity % | tenacity g/den | residual tenacity % |
| 19A (with additive) | 5.2 | 5.0 | 96.2 | 4.85 | 93.28 |
| 19C (without additive) | 5.25 | 1.77 | 33.7 | 2.05 | 39.1 |

The additive containing yarn has been employed for making fabrics for motorcar seats and has shown good dyeing properties.

Example 20

(a) In a 1000 liter autoclave are charged:
500 Kg of lauryl lactam
15 Kg of distilled water 2.8 Kg of stearic acid
0.5 Kg of compound A prepared according to Example 17.

The autoclave is washed 5 times with nitrogen and the polymerization is carried out according to the known art, under the following conditions:

Autoclave temperature: 295° C.
Maximum pressure: 18 atm
Polymerization time: 17 hours
Extrusion temperature: 270° C.

The polyamide 12 polymer obtained is extruded and cut into chips as in Example 18 and will be designated by the abbreviation "20A".

The inherent viscosity of the polymer obtained, measured in metacresol, was 1.09.

A comparison polyamide 12 is prepared the same way, but without the additive A, and will be designated by the abbreviation "20C".

(b) Test pieces are molded from a sample of polymer 20A and a sample of polymer 20C.

| Molding conditions: | | |
|---|---|---|
| Humidity | | less than 0.035% |
| Polymer temperature | | 210° C. |
| Mold temperature | | 20° C. |
| Polymer retraction | 20C | 1.28% |
| | 20A | 1.30% |

The test pieces have been subjected to tests of heat stability in air oven at 122±2° C. for 12 days and the following results have been obtained:

TABLE NO. 7

| Samples | Characteristics of the samples before treatment | | Characteristics after 12 days at 122° C. | | | |
|---|---|---|---|---|---|---|
| | Breaking load Kg/cm² | Impact resistance Kg cm/cm | Breaking load | | Impact resistance | |
| | | | Kg/cm² | Breaking load retained as % | Kg cm/cm | Impact resistance retained as % |
| 20A (with additive) | 456 | 3.28 | 415 | 91 | 3.02 | 92 |
| 20C (without additive) | 455 | 3.25 | 159 | 35 | 0.91 | 28 |

Flexible tubes having an inner diameter of 4 mm and an outer diameter of 6 mm, produced by extrusion at 215° C. from polymer 20A, have shown good flexibility even at low temperatures and good resistance to thermal oxidation.

Such tubes produced are suitable for gasoline pipe lines in motorcar engines.

Example 21

(a) In a 1000 liter autoclave are charged 600 Kg of Ω-aminoundecanoic acid

10 Kg of distilled water
1.4 Kg of stearic acid

The autoclave is washed 5 times with nitrogen and the polymerization is carried out under the following conditions:

Autoclave temperature: 256° C.
Maximum pressure: 4 atm
Polymerization time: 10 hours
Temperature of extrusion from the autoclave: 240° C.

After 3 hours at the pressure of 4 atm, the product is brought to room pressure during 4 hours and maintained for 3 hours at that pressure until the total 10 hours required for the polymerization have passed and the resulting polyamide 11 is then extruded and cut into chips as in Example 18; it will be designated by the abbreviation "21C".

It has inherent viscosity in methacresol 0.98. 10 Kg of master batch MB 19A polymer prepared as described in Example 19 paragraph (a), are added to 300 Kg of 21C polyamide 11. The mixture is dried for 10 hours in a rotating drum at 115° C. under residual pressure of 0.6 mm Hg, whereby a polymer residual humidity of 0.05% is obtained. The dry polymer containing the additive will be designated by the abbreviation "21A".

(b) Test pieces are molded from a sample of polymer 21A and a sample of polymer 21C.

| Molding conditions: | | |
|---|---|---|
| Residual humidity | | less than 0.06% |
| Polymer temperature | | 256° C. |
| Mold temperature | | ≅18° C. |
| | 21C | 1.20% |
| Polymer retraction | 21A | 1.18% |

The test pieces thus obtained, having an opalescent white appearance, have been subjected to heat stability tests in air oven at 122±2° C. for 12 days.

The following results have been obtained:

TABLE NO. 8

| Sample | Characteristics of the sample before treatment | | Characteristics after 12 days at 122° C. | | | |
|---|---|---|---|---|---|---|
| | Breaking load Kg/cm² | Resistance to impact Kg cm/cm | Breaking load | | Resistance to impact | |
| | | | Kg/cm² | Breaking load retained as % | Kg cm/cm | Resistance to impact retained as % |
| 21A (with additive) | 430 | 5.6 | 399 | 93 | 4.98 | 89 |
| 21C (without additive) | 432 | 5.2 | 121 | 28 | 1.51 | 29 |

The 21A polymer has application characteristics which are very similar to those of polymer 20A. It is adapted for the production of yarns, molded or extruded pieces (e.g. tubes) for which high resistance to heat degradation, low absorption, impermeability to hydrocarbons, white colour, flexibility and resistance to impact even at low temperatures, are required.

We claim:

1. A clear, aqueous liquid adapted to increase the light and heat stability of polyamides, which comprises: water, at least one univalent copper salt bound to at least one halogen atom and to at least one organic compound (B) miscible with or soluble in water and capable of decreasing the precipitating ability of the univalent copper salt in water, the molar ratio $\Sigma X/Cu^+$ wherein $\Sigma X$ represents the sum of the halogens being less than 8 and the amount of compound (B) being sufficient to maintain the compound CuX or its complexes in solution at temperatures lower than 60° C.

2. The composition according to claim 1, wherein the molar ratio $\Sigma X/Cu^{\oplus}$, is not greater than 5.

3. The composition according to claim 2, wherein the molar ratio $\Sigma X/Cu^{\oplus}$ is comprised between 1.8 and 5.

4. The composition according to claim 1, wherein the weight ratio of compound (B) to copper, reckoned as metal, is higher than 3.0, while the weight ratio of compound (B) to water is higher than 0.44.

5. The composition according to claim 4, wherein the weight ratio of compound (B) to copper, reckoned as metal, is higher than 4.5.

6. The composition according to claim 4, wherein the weight ratio of compound (B) to water is higher than 0.5.

7. The composition according to claim 1, wherein compound (B) is selected from the group consisting of caprolactam, acetone, alcohols, ethylene glycol, dioxane and furane.

8. A process for the preparation of a composition according to claim 1, which comprises the steps of:
(a) dissolving copper metal, in at least one hydrohalogenic aqueous acid, and heating the resulting mixture to a temperature between 80° and 160° C. while eliminating by distillation a part of the water present and/or formed to maintain the acid at a high concentration during its reaction with the copper;
(b) adding an amount of compound (B) sufficient to prevent precipitation at a temperature of about 60° C., to the complex $$[Cu\ XX_1]^-H^+ \qquad (2)$$

wherein X and $X_1$, are the same or different, and represent a halogen atom.

9. The process according to claim 8, wherein the weight ratio of compound (B), added in step (b), to the complex having the formula (2) is greater than 0.6.

10. The process according to claim 9, wherein the weight ratio of compound (B) to the complex having the formula (2) is greater than 1.

11. The process according to claim 8, wherein the molar ratio $\Sigma X/Cu$ in stage (a) is comprised between 3 and 8.

12. The process according to claim 1, wherein said molar ratio is about 4.

13. The process according to one of claim 8, wherein compound (B) is added to the compound having the formula (2) at a temperature between 80° and 160° C.

* * * * *